Figures 1, 2:
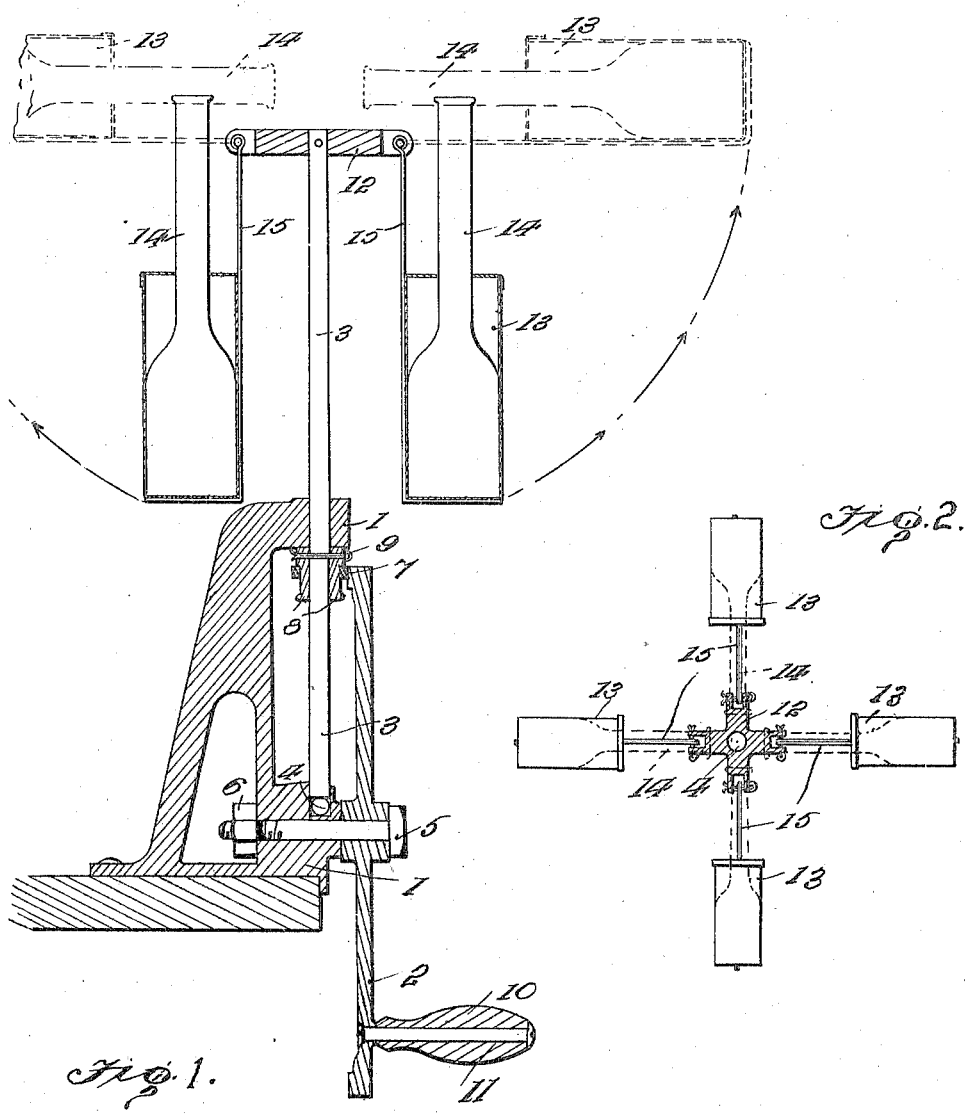

H. C. BERRY.
MILK AND CREAM TESTER.
APPLICATION FILED OCT. 5, 1908.

950,741.

Patented Mar. 1, 1910.

Witnesses

Inventor
H. C. Berry.

By
Attorneys

UNITED STATES PATENT OFFICE.

HARRY C. BERRY, OF TOLEDO, OHIO.

MILK AND CREAM TESTER.

950,741.  Specification of Letters Patent.  Patented Mar. 1, 1910.

Application filed October 5, 1908. Serial No. 456,214.

*To all whom it may concern:*

Be it known that I, HARRY C. BERRY, citizen of the United States, residing at Toledo, in the county of Lucas and State of Ohio, have invented certain new and useful Improvements in Milk and Cream Testers, of which the following is a specification.

My invention consists of a device for testing both milk and cream to show the percentage of fat contained therein, same to be used in conducting the well known Babcock test.

The invention has special reference to centrifugal milk and cream testers that are operated by hand power, and are designated as hand testers; and the object of my invention is to provide a small and compact tester, which is easily operated.

Another object of my invention is to provide a hand tester that is simple, durable, and can be placed in the hands of the farmer at a reasonable figure.

My invention consists generally in a centrifugal milk tester, comprising a vertical shaft in combination with a bottle carrier, so arranged that the bottles assume a position at right angles with relation to the shaft when carrier is rotated, all as hereinafter described and pointed out in the claims.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a vertical section of a centrifugal milk tester embodying my invention; Fig. 2 is a plan view of the bottle carrier and cross head.

Corresponding and like parts are referred to in the following description and indicated in all the views of the drawings by the same reference characters.

Referring to the drawings, 1 designates a stand or frame in which is fitted a vertical shaft 3, the lower end of which rests upon a hard steel ball 4, both of which are incased in a bearing worked into the stand 1. Attached to this vertical shaft 3 by means of a key 9 is a steel spool 8 so made as to carry a friction ring 7 made of rubber, which comes in contact with the flange on the driving wheel 2, which revolves on the spindle 5 and is held in proper relation to the friction ring 7 by means of the threads and lock-nut 6.

Connected with the upper end of the shaft 3 is a cross head 12, to which are pivoted or hinged the carriers 13 for the glass test bottles 14, said carriers consisting of brass cups of sufficient strength to withstand the lateral pressure, to which are attached two pieces of wire 15 running across the bottom, up one side and ending in two loops which form the pivot or hinge by which they are attached to the said head 12.

The operation is as follows: Milk or cream being placed in the bottles, the latter is then placed in the carriers 13, then the shaft is rotated at high speed by turning the handle 10—11 in the usual manner and the carriers are rotated and thrown out on their pivots by centrifugal action to the position shown by dotted lines.

The constituents of the milk separate, the heavier matter seeking the bottom of the tubes and the lighter matter, or the milk fat seeking the upper ends and a proportional analysis is enabled to be made.

The construction of the frame, the gearing and all parts of my machine are so simple, it enables me to make and assemble the parts easily, and the employment of a friction gear in a device of this kind is a decided advantage as it is absolutely noiseless, runs smooth, and in case of sudden starting or stopping there is less chance of accidents caused by breakage of glassware, than where the solid gear is used.

While the machine is particularly designed for testing milk in the manner herein set forth, it may be used for testing liquids which are separable by centrifugal action, the liquid to be tested being placed in the bottle, tubes or receptacles 14.

The machine is portable and essentially hand operated and is easy and convenient of operation and is at all times ready for use. The frictional engagement between the driver 2 and the friction ring 7 may be regulated by tightening the set nut 6 more or less upon the bolt or spindle 5 upon which the friction driver 2 is mounted, the latter being confined between the head of the spindle and a boss of the frame.

Having thus described the invention, what is claimed as new is:

1. In a testing machine, a vertically disposed driving shaft having a head secured to the upper end thereof and provided with radiating arms, the free ends of which are bifurcated to form spaced perforated ears, receptacles carried by the head and adapted to receive testing tubes, hangers having their upper ends pivotally mounted between the perforated ears of the head and their lower ends secured to the bottom of one of the sides of the adjacent receptacles, and covers forming closures for the tops of the receptacles and having central openings formed therein for the reception of the necks of the testing tubes.

2. In a testing machine, a vertically disposed driving shaft having a head secured to the upper end thereof and provided with radiating arms, the free ends of which are bifurcated to form spaced perforated ears, receptacles carried by the head and adapted to receive testing tubes, hangers depending from said head and each formed of a single strand of wire bent upon itself and secured to the bottom of the adjacent receptacle and thence extended upwardly in parallel relation to the rear wall of the receptacle and terminating in coincident eyes adapted to register with the perforations in the ears, pins extending through said eyes and perforations in the ears and forming pivotal connections between the hangers and head, and caps forming closures for the upper ends of the receptacles and having central openings formed therein to permit the passage of the necks of the testing tubes.

In testimony whereof I affix my signature in presence of two witnesses.

HARRY C. BERRY. [L. S.]

Witnesses:
H. B. AMES,
E. W. AMES.